(12) United States Patent
Kim et al.

(10) Patent No.: US 10,639,987 B2
(45) Date of Patent: May 5, 2020

(54) FUEL CAP OPENING/CLOSING STRUCTURE OF VEHICLE

(71) Applicants: Hyundai Motor Company, Seoul (KR); Kia Motors Corporation, Seoul (KR)

(72) Inventors: Hyun Wook Kim, Ansan-si (KR); Jeong Hoon Han, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 278 days.

(21) Appl. No.: 15/798,039

(22) Filed: Oct. 30, 2017

(65) Prior Publication Data

US 2018/0334028 A1 Nov. 22, 2018

(30) Foreign Application Priority Data

May 18, 2017 (KR) .................. 10-2017-0061409

(51) Int. Cl.
*B60K 15/04* (2006.01)
(52) U.S. Cl.
CPC .. *B60K 15/0409* (2013.01); *B60K 2015/0438* (2013.01)
(58) Field of Classification Search
CPC .... B60K 2015/0438; B60K 2015/0432; B60K 2015/0416; B60K 2015/0451; B60K 15/0406; B60K 15/0409
USPC ........................................ 220/86.2, DIG. 33
See application file for complete search history.

(56) References Cited

U.S. PATENT DOCUMENTS

| | | | | |
|---|---|---|---|---|
| 5,183,173 A | * | 2/1993 | Heckman ........... | B60K 15/0406 220/203.07 |
| 9,623,747 B2 | * | 4/2017 | Darpino ............. | B60K 15/0406 |
| 2007/0090113 A1 | * | 4/2007 | Otsuka ............... | B60K 15/0406 220/304 |
| 2013/0048639 A1 | * | 2/2013 | Wiese ............... | B60K 15/03504 220/315 |

FOREIGN PATENT DOCUMENTS

| | | |
|---|---|---|
| JP | 2000-109114 A | 4/2000 |
| JP | 2009-262649 A | 11/2009 |
| KR | 10-2005-0104744 A | 11/2005 |
| KR | 10-2006-0096614 A | 9/2006 |
| KR | 10-2008-0044715 A | 5/2008 |

* cited by examiner

*Primary Examiner* — Allan D Stevens
(74) *Attorney, Agent, or Firm* — Morgan, Lewis & Bockius LLP

(57) ABSTRACT

A vehicular fuel cap opening/closing structure may include a stopper hinged to a fuel inlet to rotate when a fuel cable is pulled via operation of a switch provided inside a vehicle, a fuel cap external device configured to be held in place by the stopper, the fuel cap external device being discharged in a longitudinal direction of the fuel inlet via rotation of the stopper, a fuel cap internal device fitted inside the fuel cap external device to close the fuel inlet, the fuel cap internal device being engaged with the discharged fuel cap external device, and a fuel cap handle coupled to the fuel cap internal device and held in place by the fuel cap external device to rotate the fuel cap external device and cause the fuel cap internal device to be rotated, guiding opening of the fuel inlet.

8 Claims, 6 Drawing Sheets

FUEL CAP OPENING/CLOSING STRUCTURE OF VEHICLE

CROSS-REFERENCE(S) TO RELATED APPLICATIONS

The present application claims priority to Korean Patent Application No. 10-2017-0061409, filed on May 18, 2017, the entire contents of which is incorporated herein for all purposes by this reference.

BACKGROUND OF THE INVENTION

Field of the Invention

The present invention relates to a vehicular fuel cap opening/closing structure, and more particularly, to a vehicular fuel cap opening/closing structure configured to enable a fuel door opening from inside a vehicle.

Description of Related Art

Generally, a fuel tank of a vehicle may be exposed to various risks including, for example, fuel theft or arson when the fuel tank is easily accessible without the direct/indirect approval of a driver.

To prevent the above problem, in most vehicles, fuel door opening is implemented only when the driver directly operates a switch from inside the vehicle. The driver performs fuel door opening by operating the switch from inside the vehicle at the time of refueling.

On the other hand, in the case of commercial vehicles (e.g., vans and trucks), since the fuel tank is externally exposed, fuel door opening is implemented using a fuel cap structure, which differs from a fuel door opening/closing structure of general vehicles.

With such a fuel cap structure, the, however, the driver cannot operate a switch from inside the vehicle. Therefore, when refueling, the driver needs to turn off an ignition and then steps out of the vehicle while carrying a key for fuel cap opening, or gives the key to a filling-station attendant, wherein fuel cap opening is completed using the key and refueling is implemented.

The fuel cap structure described above is inconvenient to the driver because fuel cap opening is made impossible from an occupant compartment and refueling is impossible when the driver loses the key.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicular fuel cap opening/closing structure in which a stopper is operated when a fuel cable is pulled via operation of a switch provided inside the vehicle, a fuel cap external device is discharged in an axial direction to engage with a fuel cap internal device by the operation of the stopper, and, in the present state, fuel cap opening is implemented via rotation of a fuel cap handle, wherein fuel cap opening is implemented via manipulation from inside the vehicle.

In one aspect, a vehicular fuel cap opening/closing structure includes a stopper hinged to one side of a fuel inlet, the stopper being rotated when a fuel cable is pulled via operation of a switch provided within a vehicle, a fuel cap external device configured to be held in place by the stopper, the fuel cap external device being discharged in a longitudinal direction of the fuel inlet via rotation of the stopper, a fuel cap internal device fitted inside the fuel cap external device to close the fuel inlet, the fuel cap internal device being engaged with the discharged fuel cap external device, and a fuel cap handle located inside the fuel cap external device and coupled to the fuel cap internal device the fuel cap handle being held in place by the fuel cap external device to rotate the fuel cap external device and cause the fuel cap internal device to be rotated via rotation of the fuel cap external device, guiding opening of the fuel inlet.

In an exemplary embodiment of the present invention, the vehicular fuel cap opening/closing structure may further include an elastic member disposed inside the fuel cap external device, the elastic member providing an elastic force in a direction in which the fuel cap external device is discharged.

In another exemplary embodiment of the present invention, the elastic member may be provided in a plurality inside the fuel cap external device to interconnect the fuel cap external device and the fuel cap handle.

In still another exemplary embodiment of the present invention, the fuel cap external device may include a first holding member configured to bend toward opposite side surfaces of the fuel cap internal device, a second holding member configured to bend in a direction in which the second holding member faces the first holding member to be held in place by the stopper, and a coupling member integrally coupled inside the second holding member, the coupling member having a toothed internal circumferential surface.

In yet another exemplary embodiment of the present invention, the first holding member may have a fastening groove configured to allow the fuel cap handle to be held in place.

In still yet another exemplary embodiment of the present invention, the fuel cap internal device may include a body disposed to face the coupling member inside the fuel cap external device, the body having a shape corresponding to that of the internal circumferential surface of the coupling member, and an insertion member integrally coupled to a bottom of the body and configured to be inserted into the fuel inlet to selectively open the fuel inlet via rotation of the body.

In a further exemplary embodiment of the present invention, the insertion member may have a screw-thread formed on an external circumferential surface thereof corresponding to an internal shape of the fuel inlet.

In another further exemplary embodiment of the present invention, the fuel cap handle may be coupled to the fuel cap internal device to rotate freely relative to the fuel cap internal device inside the fuel cap external device.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for an exemplary embodiment both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
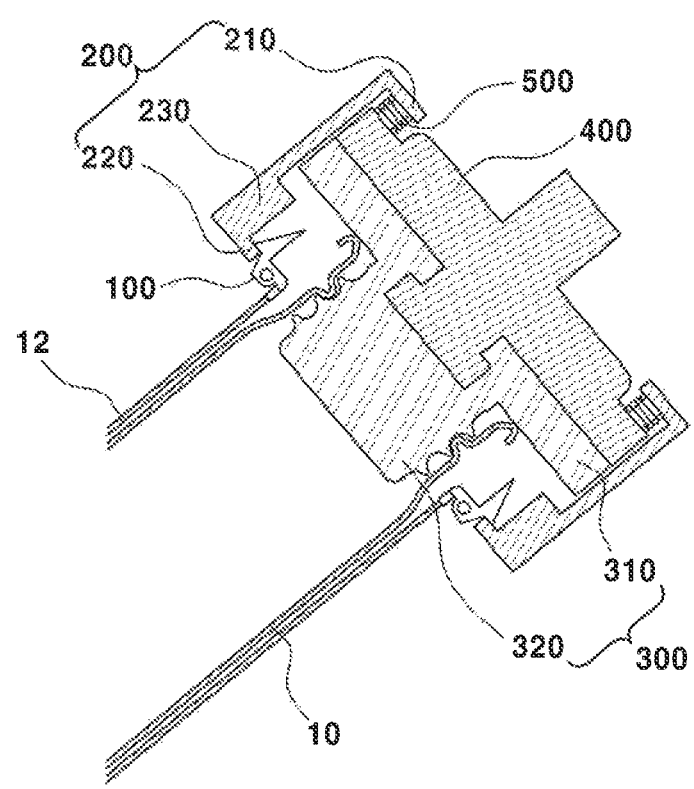
FIG. 1 is a view illustrating a vehicular fuel cap opening/closing structure illustrating a cross section cut along A-A in FIG. 6 according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below.

While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 6:
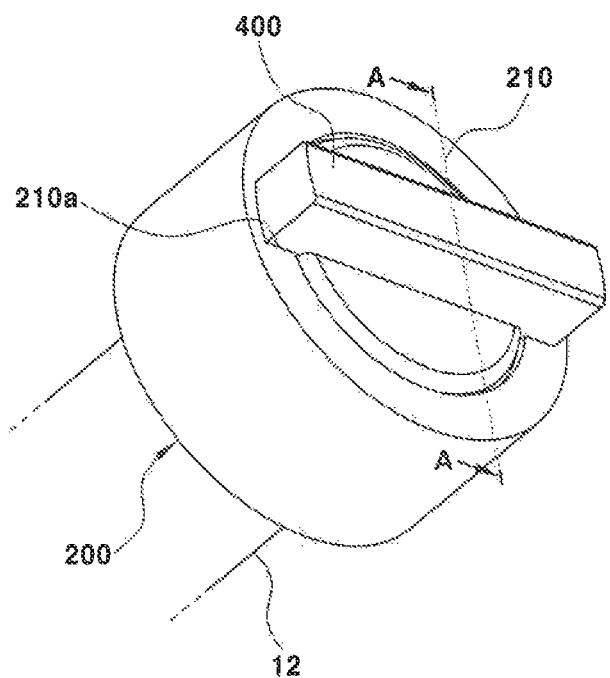
FIG. 6 is a view illustrating a disposed state of a fuel cap handle in a vehicular fuel cap opening/closing structure according to an exemplary embodiment of the present invention.

FIG. 1 is a view illustrating a vehicular fuel cap opening/closing structure illustrating a cross section cut along A-A in FIG. 6 according to an exemplary embodiment of the present invention, FIG. 2 is a view illustrating a sequence of fuel cap opening in the vehicular fuel cap opening/closing structure according to the exemplary embodiment of the present invention, and FIG. 3 is a view illustrating a sequence of fuel cap closing in the vehicular fuel cap opening/closing structure according to the exemplary embodiment of the present invention.

As illustrated in FIG. 1, the vehicular fuel cap opening/closing structure according to the present exemplary embodiment includes a stopper 100, a fuel cap external device 200, a fuel cap internal device 300, and a fuel cap handle 400.

First, the stopper 100 is hinged to one side of a fuel inlet 10 and is configured to rotate when a fuel cable 12 is pulled via operation of a switch, which is provided inside the vehicle.

In the case of commercial vehicles (e.g., vans and trucks), since a fuel tank is externally exposed, the opening/closing of the fuel inlet 10 is implemented using a fuel cap structure, which is different from a fuel door structure of general vehicles.

With such a fuel cap structure, however, a driver cannot operate the switch from inside the vehicle. Therefore, when refueling, the driver needs to turn off an ignition and then steps out of the vehicle while carrying a key for fuel cap opening, or gives the key to a filling-station attendant, wherein fuel cap opening is completed using the key and refueling is implemented.

To solve the above, in the exemplary embodiment of the present invention, when the stopper 100 rotates at one side of the fuel inlet 10 by operation of the switch provided inside the vehicle, the fuel cap external device 200 may be selectively discharged, wherein fuel cap opening is implemented from inside the vehicle without the key.

Here, the fuel cap external device 200 is held in place by the stopper 100 and is discharged in a longitudinal direction of the fuel inlet 10 via the rotation of the stopper 100.

The fuel cap external device 200 includes a first holding member 210, a second holding member 220, and a coupling member 230.

The first holding member 210 is bent toward opposite side portions of the fuel cap internal device 300.

The second holding member 220 is separated from the first holding member 210, and is bent in a direction in which the second holding member 220 faces the first holding member 210 to be held in place by the stopper 100.

Furthermore, the coupling member 230 is integrally coupled inside the second holding member 220 and has a toothed internal circumferential surface to be engaged with the fuel cap internal device 300.

The fuel cap internal device 300 is fitted inside the fuel cap external device 200 to close the fuel inlet 10 using a protruding end portion thereof. When the fuel cap external device 200 is released from the stopper 100 to be discharged, the fuel cap internal device 300 is selectively engaged with the coupling member 230.

To the present end, the fuel cap internal device 300 includes a body 310 and an insertion member 320.

The body 310 is disposed inside the fuel cap external device 200 to face the coupling member 230. The body 310 has a toothed external circumferential surface, which corresponds to the toothed internal circumferential surface of the coupling member 230, to be engaged with the coupling member 230 when the fuel cap external device 200 is discharged.

The insertion member 320 is integrally coupled to a bottom of the body 310 and is inserted into the fuel inlet 10 to selectively open the fuel inlet 10.

Here, the insertion member 320 may have screw-threads formed on the external circumferential surface thereof corresponding to the internal shape of the fuel inlet 10. The insertion member 320 may rotate simultaneously with a rotation of the body 310, facilitating the closing of the fuel inlet 10.

The fuel cap handle 400 is coupled to the fuel cap internal device 300, i.e. to an upper surface of the body 310 inside the fuel cap external device 200, and is held in place by the fuel cap external device 200 to rotate with the fuel cap external device 200. The fuel cap handle 400 rotates the fuel cap external device 200 to rotate the fuel cap internal device 300 engaged with the fuel cap external device 200, guiding the opening of the fuel inlet 10.

That is, the fuel cap handle 400 protrudes outwardly from a top portion of the fuel cap external device 200 and is configured as a handle to rotate the fuel cap internal device 300. The fuel cap handle 400 selectively enables the rotation of the fuel cap internal device 300 only when the fuel cap external device 200 and the fuel cap internal device 300 are engaged with each other, causing the fuel inlet 10 to be opened or closed.

Meanwhile, the vehicular fuel opening/closing structure according to the present exemplary embodiment further includes an elastic member 500.

The elastic member 500 is disposed inside the fuel cap external device 200, and provides an elastic force in the direction in which the fuel cap external device 200, which has been released from the stopper 100, is discharged.

Furthermore, the elastic member 500 applies the elastic force to the fuel cap handle 400 and the fuel cap internal device 300 in the state in which the fuel cap external device 200 is held in place by the stopper 100, wherein the fuel inlet 10 may be reliably kept in an airtight state by the fuel cap internal device 300.

The elastic member 500 may be provided in a plurality inside the fuel cap external device 200 to interconnect the fuel cap external device 200 and the fuel cap handle 400.

Now, a sequence of fuel cap opening in the vehicular fuel cap opening/closing structure according to the present exemplary embodiment will be described below based on the above-described configuration with reference to FIG. 2.

Figure 2A:
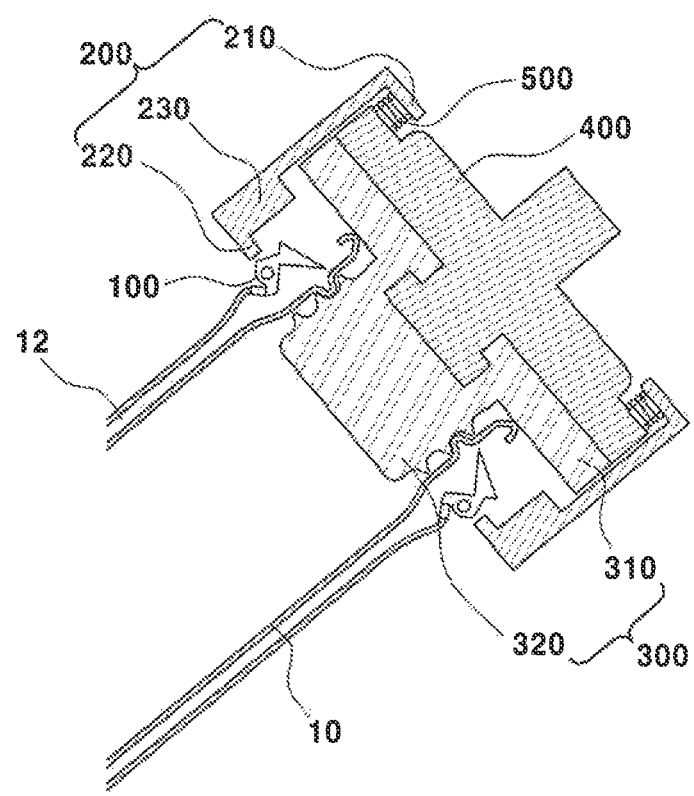
FIG. 2A and FIG. 2B are views illustrating a sequence of fuel cap opening in a vehicular fuel cap opening/closing structure according to an exemplary embodiment of the present invention.

First, as illustrated in FIG. 2A, when the fuel cable 12 is pulled via operation of the switch provided inside the vehicle, the stopper 100, which is hinged to one side of the fuel inlet 10, rotates, wherein the fuel cap external device 200 is discharged in the longitudinal direction of the fuel inlet 10.

Figure 2B:
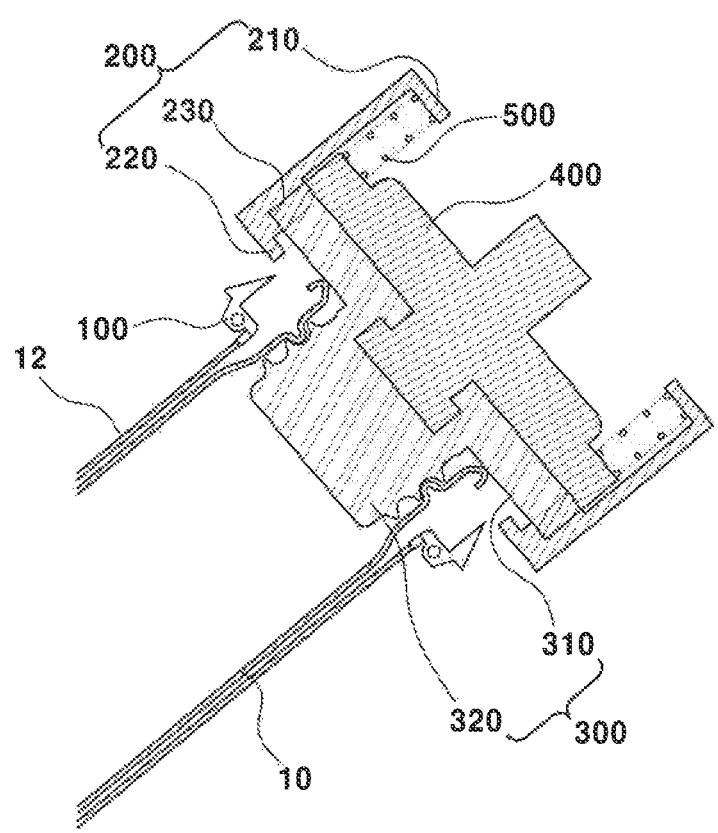

As illustrated in FIG. 2B, as the fuel cap external device 200 is discharged, the coupling member 230 and the body 310, which have the corresponding toothed internal and external circumferential surfaces, are engaged with each other. In the present state, when the fuel cap handle 400 is rotated clockwise, the fuel cap external device 200 is rotated along with the fuel cap handle 400, causing the fuel cap internal device 300 to be rotated, wherein the fuel inlet 10 is opened.

Here, the engagement of the coupling member 230 and the body 310 may be easily implemented by an elastic restoration force of the elastic member 500, which is generated when the fuel cap external device 200 is discharged.

On the other hand, when attempting to close the fuel inlet 10 that has been opened, the opening process as described above may be performed in the inverse sequence.

Figure 3A:
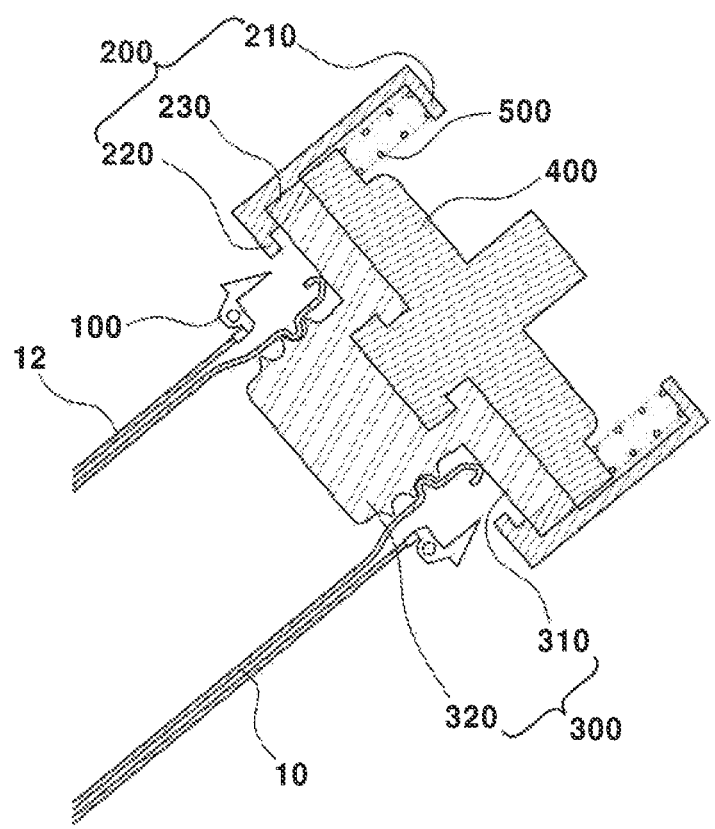
FIG. 3A and FIG. 3B are views illustrating a sequence of fuel cap closing in a vehicular fuel cap opening/closing structure according to an exemplary embodiment of the present invention.

That is, as illustrated in FIG. 3A, since the coupling member 230 and the body 310 remain engaged by the elastic member 500, when the fuel cap handle 400 is rotated counterclockwise after the insertion member 320 is disposed in the fuel inlet 10, the fuel inlet 10 is closed.

Figure 3B:
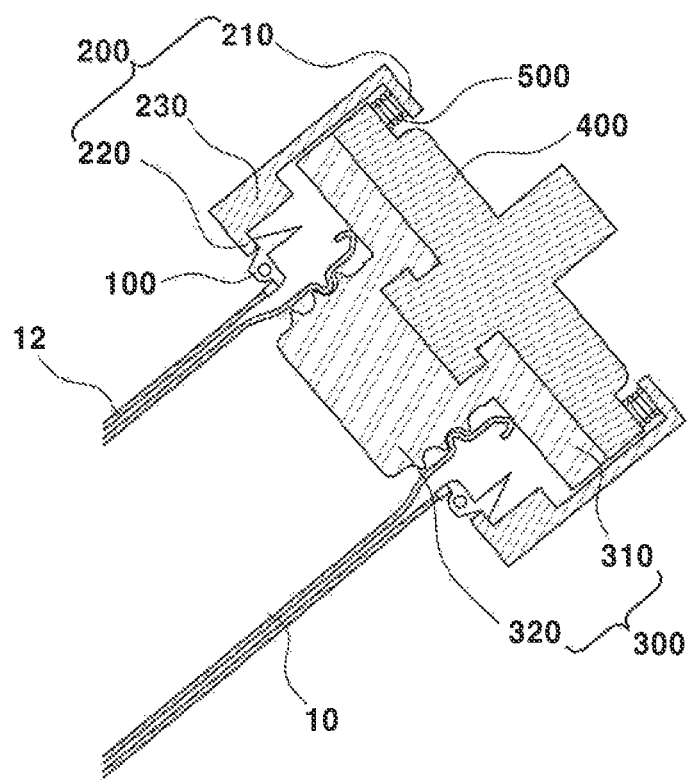

Subsequently, as illustrated in FIG. 3B, the fuel cap external device 200, which is gripped, is manually moved downwardly in the longitudinal direction of the fuel inlet 10 until the second holding member 220 passes over the stopper 100 and is held in place on the stopper 100.

Here, the stopper 100 is rotated only when the fuel cable 12 is pulled via operation of the switch provided inside the vehicle. In the state in which the switch is not operated, the stopper 100 continuously remains in an initial state due to the elastic restoration force of a coil spring provided therein.

Accordingly, in the vehicular fuel cap opening/closing structure according to the present exemplary embodiment having the configuration and operations as described above, the fuel inlet 10 may be opened via operation of the switch inside the vehicle, and at the time of refueling, no key is required for fuel cap opening, which may increase drive convenience and may also increase a value of the vehicle owing to an improved fuel cap opening structure.

Figure 4:
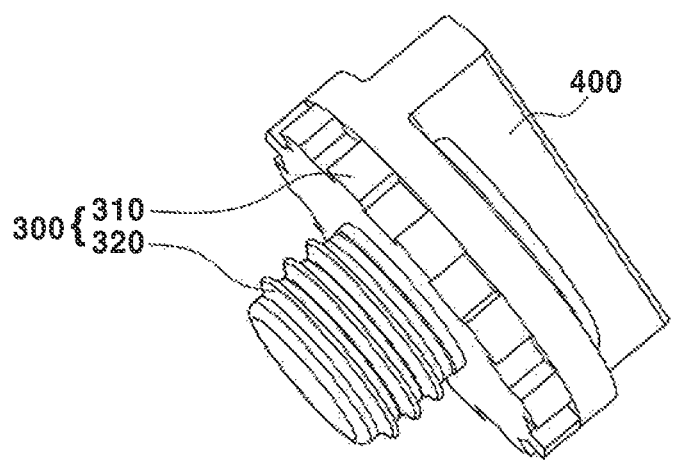
FIG. 4 is a view illustrating a configuration of a fuel cap handle in an vehicular fuel cap opening/closing structure according to an exemplary embodiment of the present invention.

FIG. 4 is a view illustrating a configuration of the fuel cap handle in the vehicular fuel cap opening/closing structure according to the exemplary embodiment of the present invention.

As illustrated in FIG. 4, in the vehicular fuel cap opening/closing structure according to the exemplary embodiment of the present invention, the fuel cap internal device 300 and the fuel cap handle 400 are configured to rotate freely relative to each other.

That is, the fuel cap handle 400 is rotatably fitted into a coupling recess 310a (see FIG. 5) formed in the center of the body 310. Accordingly, the fuel cap handle 400 and the fuel cap internal device 300 are configured to individually rotate in the state in which the coupling member 230 and the body 310 are not engaged with each other.

In the present way, a dual locking structure in which fuel cap opening is implemented via rotation of the fuel cap handle 400 only when the stopper 100 rotates to discharge the fuel cap external device 200 may be realized to prevent fuel cap opening without the approval of the driver, which may prevent, for example, fuel theft or arson.

Figure 5:
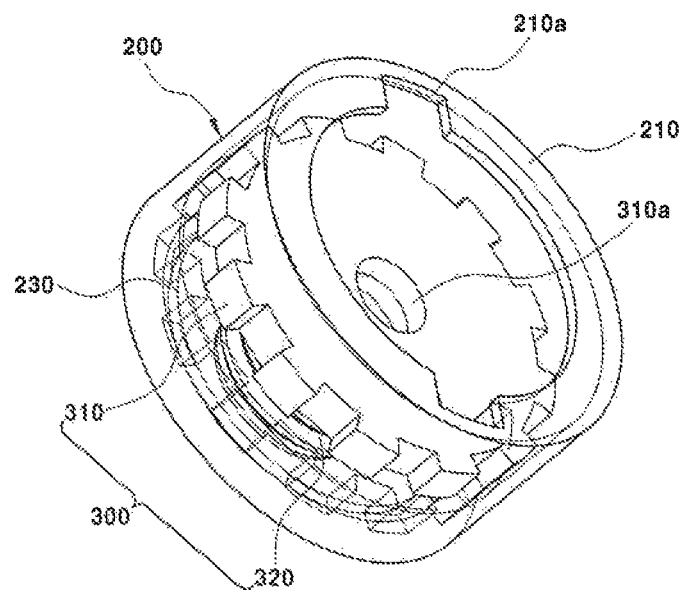
FIG. 5 is a view illustrating a configuration of a fuel cap internal device and a fuel cap external device in a vehicular fuel cap opening/closing structure according to an exemplary embodiment of the present invention.

FIG. 5 is a view illustrating a configuration of the fuel cap internal device and the fuel cap external device in the vehicular fuel cap opening/closing structure according to the exemplary embodiment of the present invention, and FIG. 6 is a view illustrating a disposed state of the fuel cap handle in the vehicular fuel cap opening/closing structure according to the exemplary embodiment of the present invention.

As illustrated in FIG. 5, in the vehicular fuel cap opening/closing structure according to the exemplary embodiment of the present invention, the fuel cap external device 200, more particularly, the first holding member 210 has a fastening groove 210a.

The fastening groove 210a is configured to allow the fuel cap handle 400 to be held on the internal circumferential surface of the first holding member 210. The fastening groove 210a may guide a position at which the fuel cap handle 400 is coupled to the top portion of the body 310, and may allow the fuel cap external device 200 to rotate simultaneously with the rotation of the fuel cap handle 400, which is held on the fuel cap external device 200.

Meanwhile, the body 310 has the toothed external circumferential surface and the coupling member 230 has the toothed internal circumferential surface for engagement between the body 310 and the coupling member 230.

When the fuel cap external device 200 is released from the stopper 100 to be discharged in the longitudinal direction of the fuel inlet 10 via operation of the switch inside the vehicle, the teeth of the coupling member 230 may be engaged with the teeth of the body 310 wherein the fuel cap handle 400 and the fuel cap external device 200 are rotated together.

That is, as illustrated in FIG. 6, since the fuel cap handle 400 and the fuel cap external device 200 are fixed to each other by the fastening groove 210a, the fuel cap external device 200 is rotated when the fuel cap 400 is rotated.

At the present time, only when the coupling member 230 is engaged with the body 310 as the fuel cap external device 200 is discharged, the fuel cap external device 200 and the fuel cap internal device 300 are rotated together by the rotation of the fuel cap handle 400. Therefore, the fuel inlet 10 may be opened only when the fuel cap external device 200 is released from the stopper 100 to be discharged.

As is apparent from the above description, in a vehicular fuel cap opening/closing structure according to an exemplary embodiment of the present invention, a stopper is operated when a fuel cable is pulled via operation of a switch provided inside a vehicle, a fuel cap external device is discharged in an axial direction to engaging with a fuel cap internal device by operation of the stopper, and, in the present state, fuel cap opening is implemented via rotation of a fuel cap handle, wherein fuel cap opening is completed via manipulation from inside the vehicle.

According to an exemplary embodiment of the present invention, driver convenience may be increased, and the value of the vehicle may be increased by an improved fuel cap opening structure.

Furthermore, with a dual locking structure for facilitating fuel cap opening via rotation of the fuel cap handle only when the stopper is operated by the cable pulling, fuel cap opening is made impossible without the approval of the driver, and for example, fuel theft or arson may be prevented.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for proposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various alternatives and modifications thereof. It is intended that the scope of the invention be defined by the Claims appended hereto and their equivalents.

What is claimed is:

1. A vehicular fuel cap opening/closing structure comprising:
   a switch provided inside a vehicle;
   a fuel cable connected to the switch;
   a stopper hinged to a first side of a fuel inlet, the stopper being rotated when the fuel cable is pulled via operation of the switch provided inside the vehicle;
   a fuel cap external device configured to be held in place by the stopper, the fuel cap external device being discharged in a longitudinal direction of the fuel inlet via a rotation of the stopper;
   a fuel cap internal device fitted inside the fuel cap external device to close the fuel inlet, the fuel cap internal device being engaged with the discharged fuel cap external device; and
   a fuel cap handle located inside the fuel cap external device and coupled to the fuel cap internal device, the fuel cap handle being held in place by the fuel cap external device to rotate the fuel cap external device and cause the fuel cap internal device to be rotated via a rotation of the fuel cap external device, guiding an opening of the fuel inlet.

2. The vehicular fuel cap opening/closing structure of claim 1, further including an elastic member disposed inside the fuel cap external device, the elastic member providing an elastic force in a direction in which the fuel cap external device is discharged.

3. The vehicular fuel cap opening/closing structure of claim 2, wherein the elastic member is provided in a plurality inside the fuel cap external device to interconnect the fuel cap external device and the fuel cap handle.

4. The vehicular fuel cap opening/closing structure of claim 1, wherein the fuel cap external device includes:
   a first holding member bent toward opposite side surfaces of the fuel cap internal device;
   a second holding member bent in a direction in which the second holding member faces the first holding member to be held in place by the stopper; and
   a coupling member integrally coupled inside the second holding member, the coupling member having a toothed internal circumferential surface.

5. The vehicular fuel cap opening/closing structure of claim 4, wherein the first holding member has a fastening groove configured to allow the fuel cap handle to be held in place.

6. The vehicular fuel cap opening/closing structure of claim 4, wherein the fuel cap internal device includes:
   a body disposed to face the coupling member inside the fuel cap external device, the body having a shape corresponding to a shape of the toothed internal circumferential surface of the coupling member; and
   an insertion member integrally coupled to a bottom portion of the body and configured to be inserted into an inside of the fuel inlet to selectively open the fuel inlet via a rotation of the body.

7. The vehicular fuel cap opening/closing structure of claim 6, wherein the insertion member has a screw-thread formed on an external circumferential surface thereof to correspond to an internal shape of the fuel inlet.

8. The vehicular fuel cap opening/closing structure of claim 1, wherein the fuel cap handle is coupled to the fuel cap internal device to rotate freely with respect to the fuel cap internal device, wherein the fuel cap handle is disposed in the fuel cap external device.

* * * * *